(12) United States Patent
Tsai et al.

(10) Patent No.: US 7,116,387 B2
(45) Date of Patent: Oct. 3, 2006

(54) DISPLAY DEVICE FOR AUTOMATICALLY SWITCHING BETWEEN 2D AND 3D IMAGES

(75) Inventors: Chao-Hsu Tsai, Hsinchu (TW); Nai-Yueh Wang, Ma-Kung (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 10/651,575

(22) Filed: Aug. 29, 2003

(65) Prior Publication Data
US 2004/0109115 A1    Jun. 10, 2004

(30) Foreign Application Priority Data
Dec. 5, 2002    (TW) ............... 91135261 A

(51) Int. Cl.
*G02F 1/1335* (2006.01)
*G02F 1/1347* (2006.01)
*G02F 1/03* (2006.01)
*G02B 27/22* (2006.01)

(52) U.S. Cl. .................... 349/117; 349/15; 349/74; 349/119; 359/259; 359/464

(58) Field of Classification Search ........ 349/117–121, 349/74, 77, 83, 15; 359/464, 291, 298, 259, 359/295
See application file for complete search history.

(56) References Cited

U.S. PATENT DOCUMENTS

| 5,831,765 A | 11/1998 | Nakayama et al. | ......... 359/464 |
| 6,157,424 A * | 12/2000 | Eichenlaub | ................. 349/74 |
| 6,246,451 B1 * | 6/2001 | Matsumura et al. | .......... 349/15 |

* cited by examiner

*Primary Examiner*—Tarifur R. Chowdhury
(74) *Attorney, Agent, or Firm*—Paul Davis; James A. Fox; Heller Ehrman LLP

(57) ABSTRACT

A display device includes a spatial light modulator, two microretarders of stripes superposed with one another and placed behind the spatial light modulator, a polarizer placed behind the two microretarders, a back light placed behind the polarizer, first and second driving devices and a carrier. The horizontal relative movement of the two microretarders is able to selectively display a 2D image and a 3D image.

5 Claims, 5 Drawing Sheets

2D MODE

2D MODE

POLARIZED LIGHT SOURCE

2D MODE

TRACKING PRINCIPLE

3D MODE

2D MODE

3D MODE

2D MODE

DISPLAY DEVICE FOR AUTOMATICALLY SWITCHING BETWEEN 2D AND 3D IMAGES

BACKGROUND OF THE INVENTION

1. Field of the Invention

The present invention relates to a display device, and more particularly to a display device which is able to automatically display a 3D image by the use of two microretarders and a polarizer to form a parallax barrier. Furthermore, with the relative movement of the microretarders, switching between 2D and 3D images and viewer-tracking are accomplished.

2. Description of Related Art

Conventional displays have developed dramatically from black and white to color. Nowadays, displays with high quality images are the current trend. Therefore, watching a 3D image without wearing additional accessories will be the next trend of display technologies. However, before all the displays have the feature to show a 3D image, thus, how to incorporate this 3D displaying feature into the current specification of an existing displays is vital for achieving the expectations and aspirations of the public.

Using a parallax barrier to separate the images received respectively by the left eye and the right eye of a human is well known in the art. U.S. Pat. No. 725,567 (1903) has already disclosed this technique. U.S. Pat. No. 5,831,765 used this well-known technique to place a parallax barrier (93) between a liquid crystal display (LCD) panel (91) and a back light (94) to form a 3D display. The improvement of this patent is that a dispersed type LCD panel (92) which is able to switch between dispersive and transparent modes is inserted between the LCD panel (91) and the parallax barrier (93) to show 2D and 3D images respectively With reference to FIG. 6, the shortcoming of this method is:

① The brightness of the LCD panel is reduced by half.

② The distance between the barrier and the LCD panel is increased, which is unsuitable for the design where the lateral width of the liquid crystal pixel is small and the watching distance is close.

③ The dispersed type LCD panel is expensive so that the overall cost of the display is increased.

④ Non-continuous viewer tracking. If the viewer moves from one position to another, the viewing angle is thus changed, which results in the 3D image is not perceivable.

U.S. Pat. No. 6,157,424, includes an LCD panel (91'), a striped LC parallax barrier (93') and a back light (94'), also uses the parallax barrier to separate the images received by the left eye and the right eye respectively to show a 3D image. The improvement of this patent is that a striped LCD panel is used instead of a general parallax barrier. The LCD panel also is able to switch between the 2D-image and the 3D-image modes.

With reference to FIG. 7, the device suffers from the following drawbacks:

① high cost; and

② non-continuous viewer tracking.

To overcome the shortcomings, the present invention tends to provide an improved display device to mitigate and obviate the aforementioned problems.

SUMMARY OF THE INVENTION

The primary objective of the present invention is to provide an improved display device which is able to switch between a 2D mode and a 3D mode by using two microretarders to allow an viewer to perceive 2D and 3D images.

Another objective of the present invention is to use relative horizontal movement between the two microretarders to allow the viewer to continuously keep tracked in the 3D image viewing zones.

In order to accomplish the objectives, the display device of the present invention has two vertically-striped microretarders. The vertical stripes of one microretarder are divided into odd stripes and even stripes. The odd stripes have a phase retardation 0 and the even stripes have a phase retardation $\pi$, or vice versa. That is, the odd stripes have a phase retardation $\pi$ and the even stripes have a phase retardation 0. The odd stripes of the other microretarder have a phase retardation 0 and the even stripes of that microretarder have a phase retardation $-\pi$ or vice versa. After the two microretarders are superposed with one another, with the relative position between the two microretarders, 2D and 3D images are displayed.

Other objects, advantages and novel features of the invention will become more apparent from the following detailed description when taken in conjunction with the accompanying drawings.

BRIEF DESCRIPTION OF THE DRAWINGS

FIGS. 6a and 6b are schematic views of the U.S. Pat. No. 5,831,765, wherein FIG. 6a is in the 3D mode and FIG. 6b is in the 2D mode.

FIGS. 7a and 7b are schematic views of the U.S. Pat. No. 6,157,424, wherein FIG. 7a is in the 3D mode and FIG. 7b is in the 2D mode.

DETAILED DESCRIPTION OF THE PREFERRED EMBODIMENT

Figure 1A:
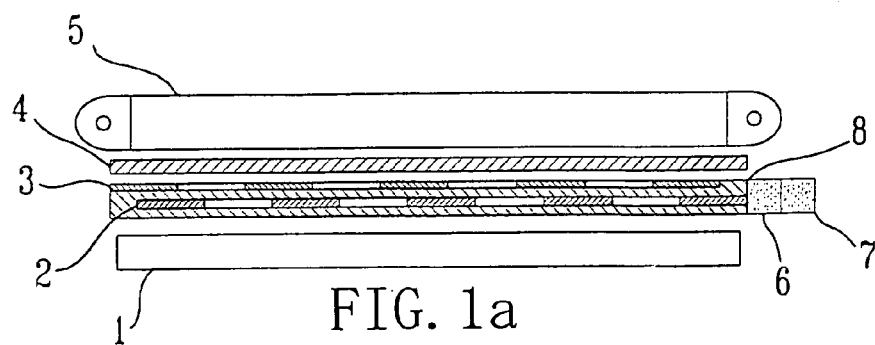
FIG. 1a is a schematic structural view showing the display device of the present invention is able to show a 3D image.
Figure 1B:
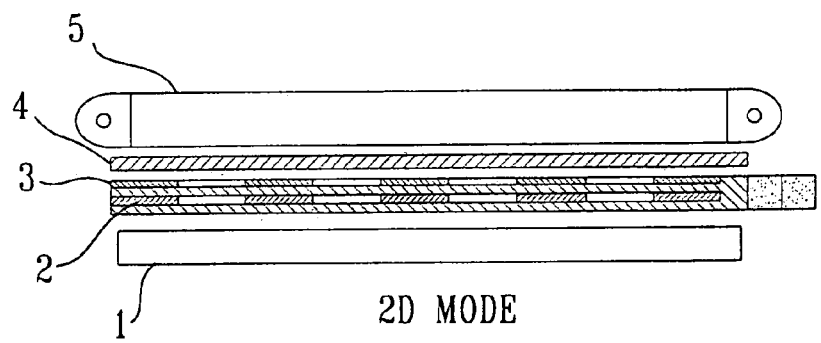
FIG. 1b is a schematic structural view showing the display device of the present invention is able to show a 2D image.

With reference to FIGS. 1a and 1b, the display device in accordance with the present invention includes a spatial light modulator (1), two microretarders (2,3), a polarizer (4), a back light (5), two driving devices (6,7) and a carrier (8), wherein the relative horizontal movement between the two microretarders (2,3) is able to switch between a 2D mode and a 3D mode.

Figure 2:
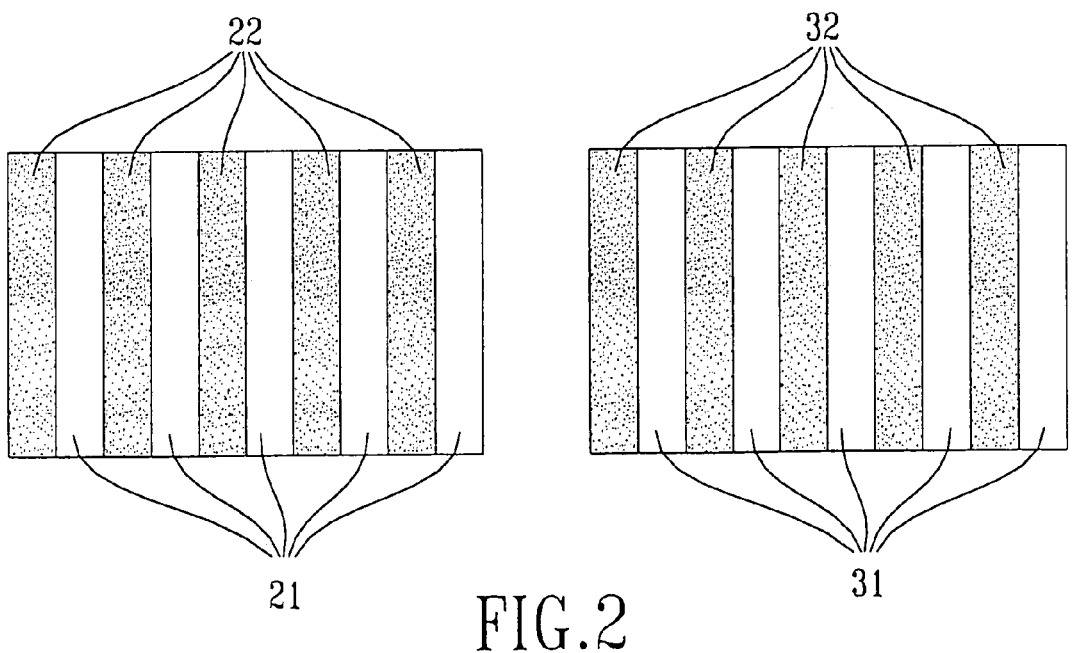
FIG. 2 is a schematic view showing the microretarders used in the display device of the present invention.

With reference to FIG. 2, it is noted that each microretarder (2,3) has multiple vertical stripes which are divided into odd stripes (21,31) and even stripes (22,32). The odd stripes (21) of one microretarder (2) have a phase retardation 0 and the even stripes (22) have a phase retardation $\pi$, or vice versa. That is, the odd stripes (21) have a phase retardation $\pi$ and the even stripes (22) have a phase retardation 0. The odd stripes (31) of the other microretarder (3) have a phase retardation 0 and the even stripes (32) of that microretarder (3) have a phase retardation $-\pi$ or vice versa.

Figure 3:
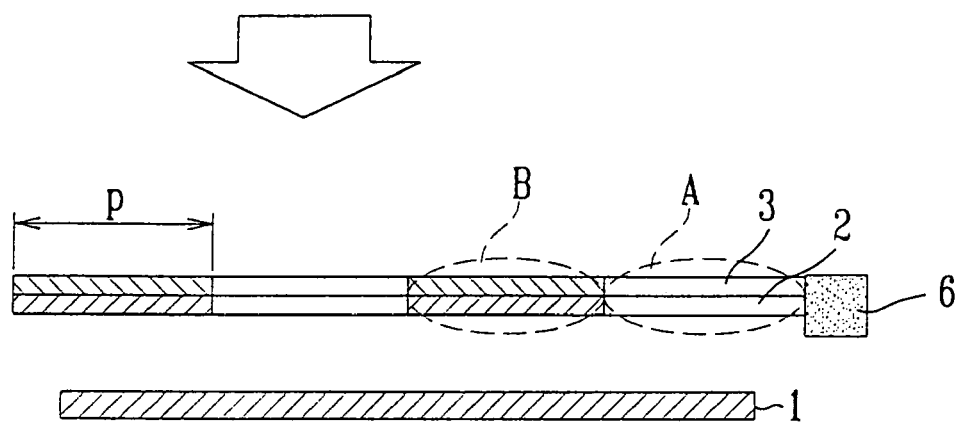
FIG. 3 is a schematic view showing the structural relationship of the parts used in the display device to show a 2D image.
Figure 3:

With reference to FIG. 3, after placing the LCD panel (1) in front of the two microretarders (2,3), if the microretarder (2) (or microretarder (3)) is driven by the driving device (6) to exactly superpose the stripes (21,22) (or (31,32)) with the stripes (31,32) (or (21,22)), there are two conditions of the superposition:

| | |
|---|---|
| A: 21 + 31 | the accumulated phase retardation is $0 + 0 = 0$ |
| B: 22 + 32 | the accumulated phase retardation is $\pi - \pi = 0$ |

That is to say the effective retardation of the two superposed microretarders (2,3) disappears completely and there is no barrier formed for a 3D image, and the display device functions just the same as that of a usual 2D display. Furthermore, the polarization direction of the polarizer (4) can be selected to be the same as the polarizer of the LCD panel (1), so there is no loss in brightness.

Figure 4:
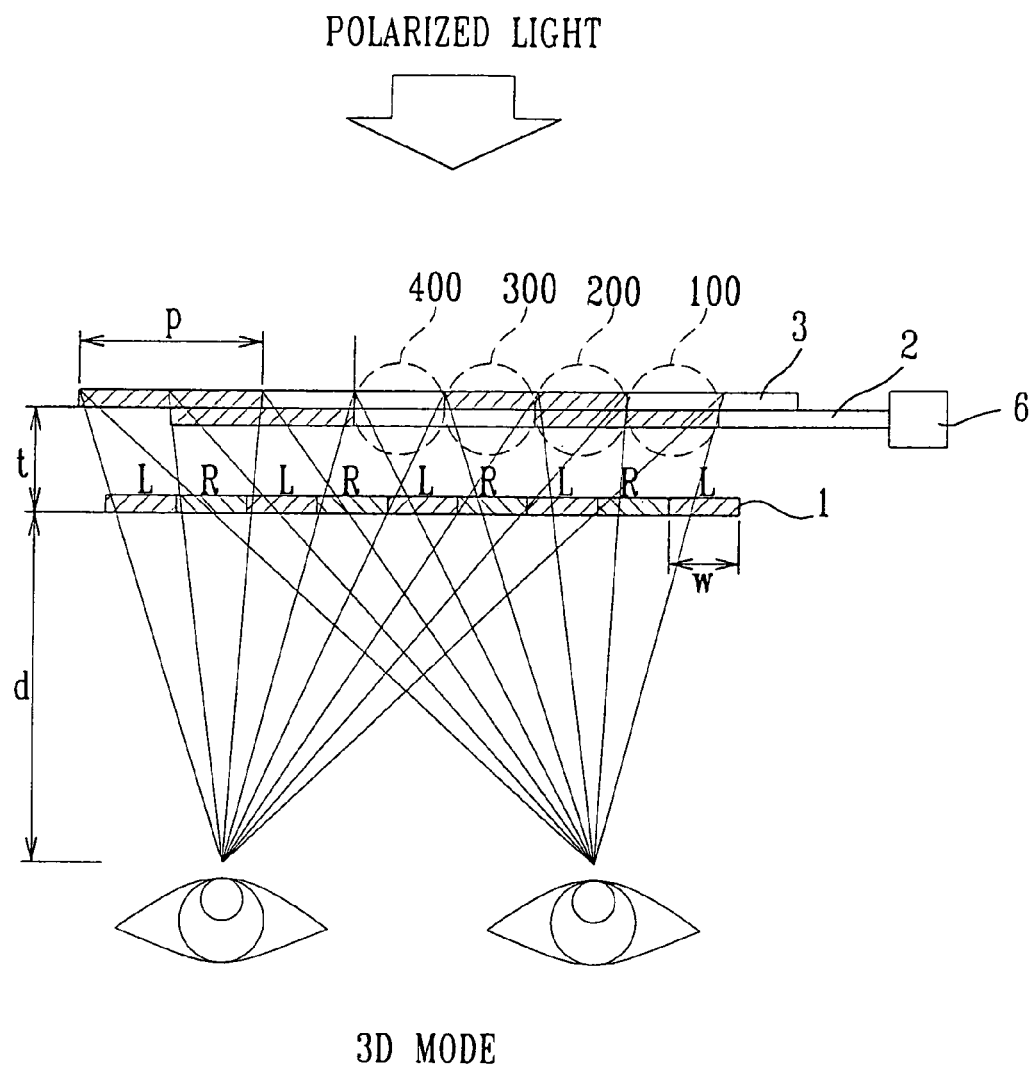
FIG. 4 is a schematic view showing the structural relationship of the parts used in the display device to show a 3D image.
Figure 5:
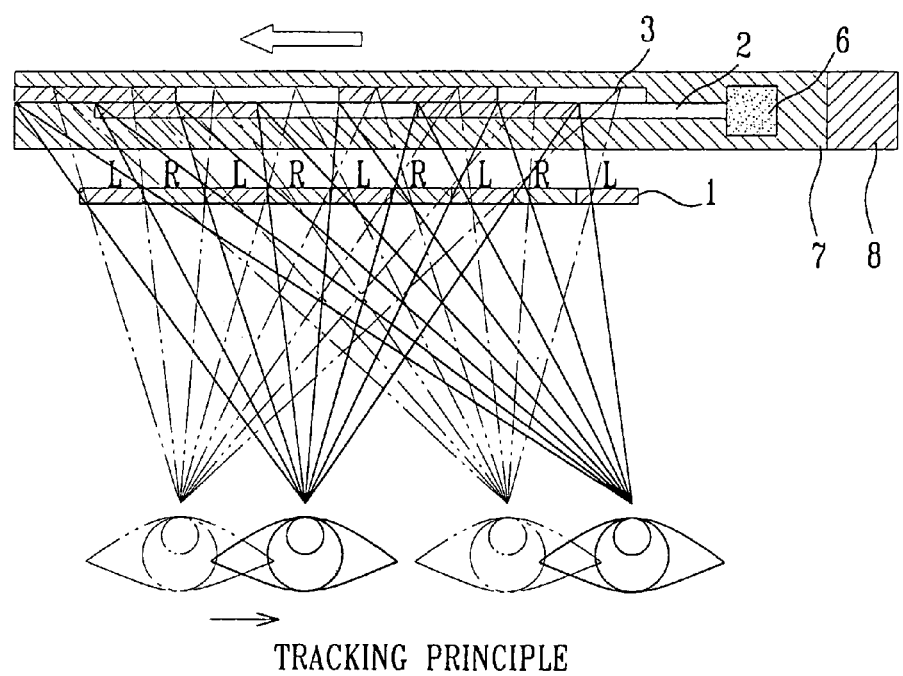
FIG. 5 is a schematic view showing the principle of image tracking of the display device of the present invention.
Figure 6A:
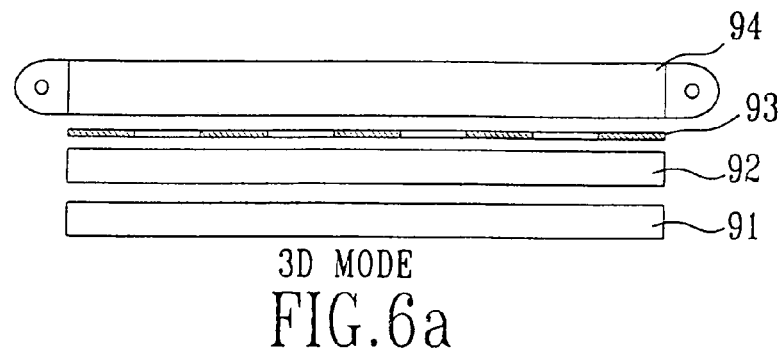
Figure 6B:
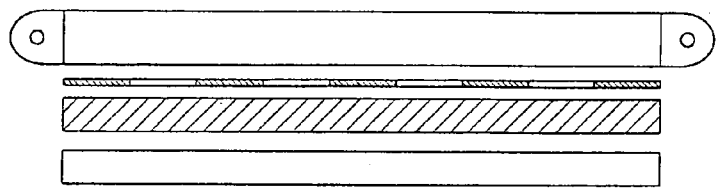

With reference to FIG. 4, if the driving device (6) drives the microretarder (2) (or (3)) to shift horizontally for the distance of one half (½) of the pitch (P) of one stripe existing between the microretarders (2,3), wherein P is slightly larger than two (2) times of the LCD panel (1) pixel width (W), the following relationship is matched, wherein:

$$P=2W(d+t)/d$$

wherein
P is the stripe pitch of the microretarder;
W is the LCD panel pixel width
d is the distance between the viewer and the LCD panel; and
t is the distance between the LCD panel and the microretarder.

Under this condition, there are four different superpositions between the two microretarders:

| | |
|---|---|
| A: 22 + 33 | the accumulated phase retardation $\pi + 0 = \pi$ |
| B: 22 + 31 | the accumulated phase retardation $\pi - \pi = 0$ |
| C: 21 + 32 | the accumulated phase retardation $0 - \pi = -\pi$ |
| D: 21 + 31 | the accumulated phase retardation $0 + 0 = 0$ |

Because $\pi$ and $-\pi$ function the same to the polarized light of 45 degrees, after the two microretarders (2,3) are combined in the foregoing manner, the two microretarders (2,3) actually function the same as one microretarder with a stripe pitch of P/2. After incorporation with the polarizer of the LCD panel, the effect of the combined two microretarders (2,3) is the same as a black and white parallax barrier with a stripe pitch of P/2.

Figure 7A:
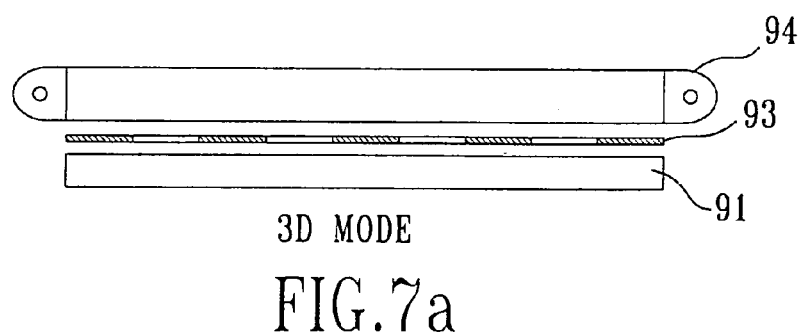
Figure 7B:
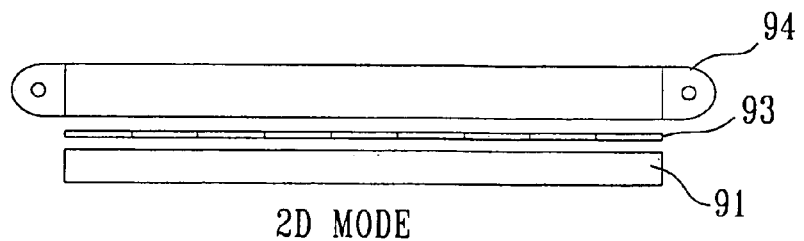

With reference to FIG. 7 showing a 3D display device of a prior art if the viewer moves, consequently the observer will lose the 3D image perception. However, with the display device of the present invention, the viewer can still perceive the 3D image. One method is to shift the image to the left (or to the right) for a pixel to swap the images received by the right eye and the left eye. Another method is to move the carrier (8) with the microretarders (2,3) as well as the driving device (6) by the driving device (7). When the viewer moves to the right, the carrier (8) moves to the left to keep the viewer's eyes at the best viewing positions. Preferably the maximum displacement is set to be P/2. When the carrier (8) moves beyond the maximum displacement, the image needs to be shift accordingly so as to keep the viewer's eyes at the best viewing positions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display device comprising:
a spatial light modulator, wherein the spatial light modulator is an LCD panel;
a first microretarder and a second microretarder superposed with the first microretarder and placed behind the spatial light modulator, wherein each of the two microretarders has multiple vertical stripes, a portion of the vertical stripes of one of the microretarders has a phase retardation $\pi$ and a portion of the vertical stripes of the other microretarder has a phase retardation $-\pi$, wherein other portions of the vertical stripes of the two microretarders have a phase retardation of 0;
a polarizer placed behind the two microretarders;
a back light placed behind the polarizer;
a first driving device connected to the first microretarder to move the first microretarder and a second driving device connected to a combination of the first microretarder and the first driving device to move the combination; and
a carrier, wherein relative horizontal movement of the two microretarders results in the display device to alternatively display a 2D image and a 3D image.

2. The display device as claimed in claim 1, wherein each vertical stripe of the two microretarders has a width which is slightly larger than two times of a pixel width on the spatial light modulator.

3. The display device as claimed in claim 2, wherein the first microretarder is able to be driven by the first driving device to move horizontally, and the combination of the two microretarders and the first driving device is driven by the second driving device to move horizontally.

4. The display device as claimed in claim 3, wherein when the portion of phase retardation $\pi$ of the first microretarder exactly superposes with the portion of phase retardation $-\pi$ of the second microretarder, and the portion of phase retardation 0 of the first microretarder exactly superposes with the portion of phase retardation 0 of the second microretarder, a 2D image is displayed.

5. The display device as claimed in claim 4, wherein when the two microretarders are staggered so that the portion of $\pi$ phase retardation of the first microretarder superposes both partially on the portion of $-\pi$ phase retardation and partially on the portion of 0 phase retardation of the second microretarder; meanwhile the portion of $-\pi$ phase retardation of the second microretarder superposes both partially on the portion of $\pi$ phase retardation and partially on the portion of 0 retardation of the first microretarder, thus, the device is able to show a 3D image.

\* \* \* \* \*